United States Patent [19]

Shih et al.

[11] Patent Number: 4,487,855

[45] Date of Patent: Dec. 11, 1984

[54] COLORED LATEXES; METHODS FOR MAKING SAME AND COLORED FINELY DIVIDED PRODUCTS

[76] Inventors: Yen-Jer Shih, 30 Marvin La., Piscataway, N.J. 08854; Mohamed S. El-Aasser, 2345 Edgewood Ave., Bethlehem, Pa. 18017; John W. Vanderhoff, 345 Ninth Ave., Bethlehem, Pa. 18018

[21] Appl. No.: 466,598

[22] Filed: Feb. 15, 1983

[51] Int. Cl.³ ............................................. C08F 8/30
[52] U.S. Cl. ................................. 523/201; 524/551; 524/567; 525/330.7; 525/331.4; 525/376
[58] Field of Search ............... 523/201; 525/376; 524/551, 567

[56] References Cited

U.S. PATENT DOCUMENTS

| | | | |
|---|---|---|---|
| 3,265,767 | 8/1966 | Caldwell et al. | 523/201 |
| 3,380,987 | 4/1968 | Palm et al. | 525/376 |
| 3,535,255 | 10/1970 | Kalopissis et al. | 525/376 |
| 3,797,994 | 3/1974 | Kalopissis | 525/376 |

*Primary Examiner*—Joseph L. Schofer
*Assistant Examiner*—Bernard Lipman
*Attorney, Agent, or Firm*—Samson B. Leavitt; Michael A. Leavitt

[57] ABSTRACT

The present invention relates to colored latex products, and especially to colored synthetic polymer emulsions, the finely divided colored polymers obtainable therefrom, and methods for making the colored polymer emulsions as well as the polymers as colored, finely divided solids.

22 Claims, No Drawings

COLORED LATEXES; METHODS FOR MAKING SAME AND COLORED FINELY DIVIDED PRODUCTS

BACKGROUND OF THE INVENTION

Originally, the milky liquid obtained from rubber trees was called "latex"; now this term refers to an aqueous dispersion of polymeric substances whether they are natural or synthetic. Latexes can be made by emulsion polymerization from the monomer or by emulsification of resins.

Due to environmental and energy problems, water-based systems are becoming more and more desirable. Nowadays, latexes are widely used in adhesives, textiles, inks, plastics, coatings, photographic applications, pharmaceuticals, and paper industries. In addition, monodisperse latexes also have important applications in the fields of medical, biological, and fundamental research studies. Latexes are required to be stable during preparation, storage, formulation, and applications. The stability of latexes is dependent on the total interaction energies between the particles. This has been described by the DLVO theory.

Polystyrene latexes have been used as pigment particles in paper coating, and the coating prepared from monodisperse polystyrene latex particles of different sizes has been tested for light scattering efficiency.

It has been found that a plastic pigment of polystyrene latex can meet most of the criteria for an ideal pigment. The criteria are: (1) low specific gravity, (2) high brightness, (3) high refractive index, (4) controlled particle size, (5) easily dispersible, (6) chemically inert, (7) compatible with other pigments, (8) nonabrasive, (9) low adhesive demand, (10) high price/performance efficiency. Usually plastic pigments are white in color, and the opacity can be changed by the variation of the particle size, but no satisfactory colored plastic pigments have yet been made.

Colored latexes have been made from polymerizable dyestuffs. Colored copolymers have been suggested in latex form for coating of leather. It has also been reported that colored latexes can be made by the reaction of an aqueous dispersion of microgel with hydrogen bromide through the unsaturated double bond and then followed by a nucleophilic substitution reaction with dye-molecules (Kolthoff et al, J. Polymer Sci. 15 459 (1955)).

The chemical modifications of reactive microgels cannot be carried out in aqueous solution, but involve the use of organic solvent systems. Besides, the particle sizes of microgels are usually between 5 nm and 50 nm which are too small to be used as pigments in coating applications. One of the major problems in the preparation of highly crosslinked reactive microgels is the occurrence of agglomeration phenomena, which leads to total coagulation. For polymerizable dyestuffs, the copolymerization reactivity ratios must be considered in copolymerization with styrene in addition to the solubility problem.

Generally there are three methods described in the prior art for the incorporation of dyes into a polymer latex. In "The Applications of Synthetic Resin Emulsions" by H. Warson, Ernest Benn Ltd., London, 1974 beginning on Page 848 it is stated:

"It is possible to obtain colored copolymers, even in emulsion by copolymerizing dye-stuffs including unsaturated groups, azo dyes and anthraquinone dyes being particularly suitable. These groups may be a vinyl group on an ester, an acrylate on a base, a vinylsulfonamide derivative and so on. A range of colors are available. Various specifications quote the method of preparing the colored copolymers (G. Krehbiel (to BASF), Brit. No. 877,402 (1961); H. Wilhelm (to BASF), Brit. No. 914,354 (1961); K. H. Beyer et al (2 BASF), Brit. No. 964,757 (1964)). Graft copolymers including polymerizable dyestuffs are also known (BASF, Brit. No. 965,627 (1964)).

These colored copolymers may be used directly in emulsion form for the coating of leather, thereby avoiding the numerous difficulties which have to be overcome when the leather is dyed independently. The dyestuff monomer is present at 1–15 percent by weight of the solids content of the emulsion, and a crosslinking agent such as N-methylolmethacrylamide is preferably present. This will have the effect of chemically combining the colored copolymer with the leather during the curing process on drying at the normal elevated temperature (F. Ebel et al. (to BASF), Brit. No. 998,550 (1965); H. Wilhelm et al. (to BASF), Brit. No. 1,063,219 (1967)).

Since this type of polymerization is novel some examples will be quoted here . . . " Warson then goes on to describe in a table "emulsion polymerization with colored monomers (F. Ebel et al. (to BASF), Brit. No. 998,550 (1965))." The table lists the following polymerizable dyestuffs.

2,4,5-trichloro-4'-(N-ethyl-N-acryloylhydroxyethyl)-aminoazobenzene 2,4-dichloro-4'-(N-ethyl-N-acryloylhydroxyethyl)-aminoazobenzene 2-methoxy-4-nitro-4'-(N-ethyl-N-acryloyhydroxyethyl)-aminoazobenzene 2-cyano-4-nitro-4'-(N-ethyl-N-acryloylhydroxyethyl)-aminoazobenzene In the polymerization, 20 parts ethyl acrylate are emulsified in 50 parts water containing 0.3 parts potassium persulfate initiator, as well as emulsifier comprising 2.0 parts 20% aqueous sodium salt of a sulfonated iso-octylphenol-polyoxyethylene adduct with 25 moles ethylene oxide and 0.24 parts 50% aqueous sodium salt of sulfonated castor oil. Another emulsion is prepared comprising 7 parts polymerizable dyestuff, 40 parts ethyl acrylate, 23 parts isobutyl acrylate, 7.5 parts acrylic acid, and 5.5 parts 45% aqueous N-methylolacrylamide in 68.5 parts water containing 8.0 parts of the same sulfonated iso-octylphenol-polyoxyethylene adduct and 0.6 parts of the same sulfonated castor oil emulsifiers. The first emulsion is heated with stirring to 80° and the second emulsion is added continuously over a one-hour period; at the same time, 1.2 parts potassium persulfate initiator in 20 parts of water are added continuously in a second stream. The polymerization is continued at the same temperature for a total time of 4 hours.

Other references from the same text include page 179, "The addition of dyestuffs (in the compounding of the emulsion) as distinct from pigments is sometimes desired. If water soluble, direct addition of a concentrate is possible, but the dyestuff ion must have the same charge as the dispersant, e.g., the cationic methyl violet types should not be used with anionic surfactants. An oil soluble dye should be dissolved in a small quantity of solvent or plasticizer before addition to the emulsion."

Also, page 888 states that, "There seems to be no reason why dyestuffs should not be added to emulsion polish compositions based on polymers, just as they are added to solvent-based products, and to direct wax polish emulsions. Compatibility, especially with the emulsifier system, as well as with the organic components, would have to be studied. An oil-soluble dye, probably in the wax component of the polyethylene would seem to be the most probable method of incorporation. The plasticizer could possible be used. A water-based dye, even if acid is likely to cause difficulty, due to bleeding, when any water is poured on to the polish, although it is possible that some types might be strongly absorbed onto the alkali-soluble resin, and thus be reasonably permanent."

Finally, page 857 describes the use of the red dyestuff, Waxolin OS, an azo dye, in the polymerization mixture, where it functions as a chain transfer agent, thus incorporating dyestuff endgroups into the polymer chain.

Another reference work, "Chemical Reactions of Polymers," E. M. Fettes, editor, Interscience, New York, 1964, describes on page 284 the nitration of polystyrene and its subsequent reduction (W. E. Hanford (to E. I. du Pont de Nemours), U.S. Pat. No. 2,396,786, Mar. 19, 1946; G. B. Bachman, H. Hellman, K. R. Robinson, R. W. Finholt, E. J. Kahler, L. J. Filar, L. V. Heisey, L. L. Lewis, and D. D. Micucci, J. Org. Chem. 12, 108 (1947)) to give polyaminostyrene, which is then diazotized and coupled with phenols and amines to give dyes which are insoluble in all solvents. Similar reactions with styrene-maleic anhydride copolymers are also reported (W. O. Kenyon, L. M. Minsk, and G. P. Waugh (to Eastman Kodak), U.S. Pat. No. 2,274,551, Feb. 24, 1942)). These reactions, however, were carried out on polymers dissolved in solvents rather than on emulsion polymers. The high electrolyte concentrations needed for the nitration and reduction reactions would almost certainly either dissolve the latex copolymer or flocculate the latex.

In the same book, D. Taber, E. E. Renfrew, and H. E. Tiefenthal, Chapter XV "Fiber-Reactive Dyes", pages 1113-64, describe the dyeing of textile fibers in some detail and review (pages 1143-7) the evidence for the formation of covalent bonds between reactive dyes and fibers.

As set out above the three general methods described in the prior art for coloring latexes are:
1. simple addition of water-soluble or oil-soluble dyes;
2. use of copolymerizable dyes; and
3. use of dyes that act as chain transfer agents.

This invention provides a different, improved method for coloring latexes.

SUMMARY OF THE INVENTION

It is accordingly an object of this invention to provide new stable, colored latexes, methods of preparing such latexes as well as the colored latex in finely divided solid form.

It is another object of this invention to provide stable, colored synthetic latexes which may be used to provide a compatible color base for other latexes (colored or uncolored).

It is still another object of this invention to provide colored latexes which may be employed to prepare colored films and coatings.

It is a further object of this invention to provide colored latexes which serve as a source of solid colored latex particles, e.g. pigments.

It is a still further object of this invention to provide a stable latex which has chemically bonded thereto a color moiety.

It is yet another object of this invention to provide a stable latex which has chemically bonded thereto an azo moiety providing thereby a colored latex.

It is yet a further object of this invention to provide a stable latex which has a protein moiety linked to the latex material by means of an azo linkage.

Another object of the present invention is to provide processes for making the foregoing products.

Still another object is to provide an azo color producing linkage in polymeric products in finely divided form.

Other objects will appear hereinafter as the description proceeds.

The foregoing and other objects are accomplished by providing a latex containing a reactive grouping which can be further reacted to produce a structure which is capable of coupling with an aromatic diazonium compound to produce an azo linkage whereby a colored latex is effected. The reactive grouping is present in a polymerizable compound (hereinafter also referred to as RGC monomer) which is, preferably an $\alpha,\beta$ monoethylenically unsaturated compound. The preferred reactive grouping is halomethyl. The base latex is prepared so that it is derived from at least one monomer which contains a reactive grouping. This monomer may constitute the entire latex particles or the monomer may be a minor component of the latex particles and thus be one of at least two copolymerizable monomers. A most preferred embodiment involves the preparation of provision of a "seed" latex which may be a poly- or monodisperse system wherein Dw/Dn=1.001 to 1.1 for a monodisperse system and Dw/Dn=1.5 to about 5.0 for a polydisperse system and most preferably a monodisperse system of Dw/Dn smaller than 1.05, and wherein
Dw=weight average particle diameter
Dn=number average particle diameter The "seed" latex (or core) may be any polymerizable monomer or mixture of monomers. Styrene is a most preferred "seed" monomer. In the seed latex environment there is then conducted the "shell" polymerization including in the monomer(s) being polymerized the reactive group-containing (RGC) monomer. In this most preferred embodiment the polymerized RGC monomer is produced as a shell on the surface of the latex seed particles. This technique is highly advantageous. Firstly one can obtain a final colored latex of monodispersivity in a simple manner. Secondly the RGC monomer is utilized to its maximum capability since it is not "buried" in the latex particle; this, obviously, maximizes the economics of the procedure as well.

The general procedure for the preparation of the colored polymers involves chemically reacting the necessary components in an aqueous environment to produce a colored latex, and then, if it is desired to obtain the polymer in dry, particulate (i.e. solid) form, to isolate the polymer from the latex.

The general chemical reactions may be divided into two paths. On the one hand the reactive-group (e.g. $CH_2Cl$) containing monomer (RGC) may be emulsion polymerized and the resultant latex then treated with a compound (A) which will make the so modified latex particles couplable to a diazonium salt to produce a colored azo compound (latex). Preferred compounds (A) are aromatic amines capable of coupling. With aromatic amines, for example, the amination of the latex polymer particles proceeds with facility at room temperature. To the aminated latex there is then added a selected diazonium salt whereafter coupling to the latex and, if desired, isolation of the resultant colored latex particles, is accomplished in known manner. It is, of course, obvious that in addition to the RGC monomer(s) other monomers may be co-polymerized therewith. In general, it is preferred that the RGC monomer(s) comprise(s) at least about 5 or more mole % of the total monomers to be polymerized and may indeed comprise all of the polymer product (i.e. homopolymerization with 100 mole % of RGC monomer).

It is also possible to utilize an already prepared polymer containing an RGC monomer in polymerized form and produce a fine aqueous suspension thereof. This suspension can then be aminated and coupled similarly to the emulsion polymerizate. Where the final desired product is latex, it is preferred to employ the first mentioned technique. Where the colored polymer particles are to be recovered as a fine powder, both techniques are suitable.

In a particularly preferred embodiment, a second path of operation is provided. In this technique the RGC monomer(s) with or without additional copolymerizable monomer(s) is polymerized in an existing polymer latex or aqueous polymer dispersion environment whereby a "shell" or surface coating of the RGC monomer(s) in polymerized form is obtained, with the environmental latex polymer particle as the "core". This is referred to as a "structured-particle". The shell polymer may be merely physically bonded to the core or chemically grafted thereon, the latter obtaining depending on polymerization conditions as well as particularly where a cross linking (e.g. difunctional) agent or monomer is used.

In addition to the use of conventional diazotizable aromatic amines as precursors for the diazonium salt one may also use protein material containing diazotizable primary amine groups to azo-link proteins to the latex particle.

DETAILED DESCRIPTION OF THE INVENTION

The essential feature of one aspect of the present invention involves the provision of reactive sites on a polymer particle which are readily reactable with a reagent to produce a modified polymer capable of coupling after such reaction to an aromatic diazonium salt, whereby the azo chromophore is chemically introduced into the modified polymer and a colored polymer results.

The reactive site in the polymer is preferably provided by a reactive halogen atom which may be haloalkyl and may be designated as

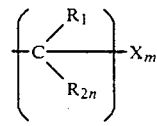

wherein n is 1 to 10; $R_1$ and $R_2$ are independently hydrogen, alkyl, halo, cyano, hydroxy, alkoxy or the like; X is halo; m is an integer from 1 to 2n; and at least one of $R_1$ and $R_2$ on a carbon vicinal to a halogen is hydrogen. However lower haloalkyl is preferred especially halomethyl and haloethyl. The reactive halogen may be any of fluorine, chlorine, bromine and iodine, with fluorine least desirable due to its minimal reactivity, and chlorine the most preferred because of acceptable reactivity, availability in monomers, and economic feasibility.

Suitable but merely representative reactive group-containing (RGC) monomers include p-vinyl benzyl chloride, p-vinyl benzyl bromide, bromomethyl acrylate, bromethylacrylate, chloromethyl acrylate, chloromethyl methacrylate, chlorethyl acrylate, chloroethyl methacrylate, chloroethyl chloroacrylate, bromoethyl α-chloroacrylate, iodoethyl acrylate, p-vinyl benzyl iodide, 2-chloroalkyl acetate, 2-chloroalkyl alcohol, 2-chloroalkyl chloride, 2-chlorobenzal acetophenone, 1-chloro-1-bromoethylene, 2-chloro-1, 3-butadiene, beta-chloroethyl itaconate, 2-chloroethylitaconate, 1-chloro-1-propene, 2-chloro-1-propene and α-chlorovinyltriethoxy silane. Mixtures of any of the foregoing may also be used.

As optional comonomers for cojoint polymerization with one or more of the foregoing RGC monomers one may use any of the well known classes of α,β-ethylenically unsaturated compounds. Mention may be made of the vinyl benzenes such as styrene, vinyl toluene, tert-butyl styrene, α-methyl styrene, and divinyl benzene; vinyl halides such as vinyl chloride, vinyl bromide and vinyl fluoride; vinyl esters such as vinyl acetate, vinyl propionate and vinyl butyrate; vinyl pyridine; vinyl lactams, e.g. N-vinyl-2-pyrrolidone; vinyl ethers such as methyl vinyl ether, ethyl vinyl ether, tert-butyl vinyl ether, iso-octyl vinyl ether; acrylonitrile, acrylamide, ethylene, propylene, vinylidene halides (e.g. vinylidene chloride), acrylic acid, methacrylic acid; acrylate, methacrylate and chloracrylate esters, butadiene, isoprene, chloroprene and the like. Mixtures of any of these monomeric substances can also be used. Of preferred status are the vinyl benzenes, the vinyl esters of $C_1$ to $C_8$ aliphatic acids, the $C_1$ to $C_8$ alkyl acrylates, methacrylates and α-chloracrylates, acrylonitrile, acrylamide, ethylene and propylene. The choice of monomers will be largely dependent upon the desired physical properties of the colored particles. For the production of coatings and films one would prefer polymers which are film-formers whereas for use as pigment particles and for other uses such as for immunological tests (e.g. using a proteinated polymer particle), hard non-film-forming particles are preferred.

Any amount of these additional monomers may be used, from a trace, if desired, to 99+ mole % based on total monomer present. It is preferred when used to employ from about 5 to 95 mole % of these other monomers. This group of monomers will hereinafter be referred to as N.R.G. (non-reactive group) monomers.

Where a "structured particle" is to be prepared utilizing a first "seed" latex, the monomers for the "seed" polymer can be any of the RGC monomers as well as the NRG monomers mentioned above. In addition the "seed" polymer can be any combination of the NRG monomers to produce copolymers (including interpolymers of a multitude of monomers) or any combination of RGC monomers and finally any combination of both NRG and RGC monomers. As previously mentioned, in preparing "seed" latex for "structured particles" the preferred latex is based on styrene monomers.

It is, of course, understood and well-known in the polymerization art that not all monomers copolymerize well with each other and consequently the selection will obviously be based on such considerations particularly where economic feasibility is a major factor.

The reagents useful to modify the polymer so that it is capable of coupling to an aromatic diazonium salt are generally the couplable moieties well known in the azo dye art. These fall into 6 classes which are (1) phenols and napthols; (2) aromatic amines; (3) naphthol-, naphthylamine-, and aminonaphthol-sulfonic acids; (4) substances containing reactive methylene groups; and under exceptional conditions or with specific diazo compounds one can add (5) phenol ethers and (6) hydrocarbons. The preferred group of couplers are the aromatic amines. As a general guide it is well to bear in mind that the coupling reaction is fairly pH sensitive. Thus for amines the coupling reaction is best conducted at about pH 3.5 to pH 7.0, due ostensibly to the need for the diazonium salt to hydrolyze to the diazohydroxide which is believed to be the active coupling form. On the other hand as the pH rises the stability of the diazo-compound falls. Consequently, coupling must be viewed and considered as a race between azo-compound formation and decomposition of the diazo-compound.

Another factor to consider is that as negative substituents increase in the diazo-compound so is it able to couple in increasingly acid solution.

All couplers will per se vary as to their power to couple depending on the presence and position of negative and positive substituents. In the case of amines, coupling generally takes place in the aromatic ring para to the amine group provided there is a free replaceable (labile) hydrogen in the para position. Also, generally, substitution of primary aminohydrogen atoms by alkyl or aryl groups enhances coupling.

The preferred polymer-modifying agents to effect or insert a coupling moiety are the mono- and bicyclic aromatic primary and secondary amines which may have the variety of substituents found in such amines conventionally used as couplers in the azo dye field. Generally such other substituents are preferably hydroxyl and amino, although in many couplers chlore and nitro groups, if not promoting coupling, do not adversely affect it.

Particularly effective amine polymer-modifying reagents capable of coupling (nucleophiles) are aniline, N-methyl aniline, m-toluidine, N-methyl m-toluidine, N-methyl-o-toluidine, N-ethyl aniline, N-allyl aniline, p-hydroxyaniline, p-methoxyaniline, N-phenylenediamine, p-acetamido aniline, p-xylidene, B-naphthylamine, α-naphthylamine, Gamma-acid, J-acid and H-acid.

The preferred mono- and bicyclic amines may be depicted by the following general formulae

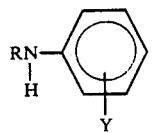

I wherein R is hydrogen or $C_1$ to $C_6$ alkyl and Y is hydroxyl, amino or $C_1$ to $C_6$ alkyl;

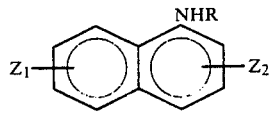

II

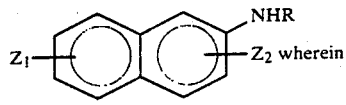

III

R is hydrogen, $C_1$ to $C_6$ alkyl or $SO_3Na$, and $Z_1$ and $Z_2$ are $-SO_3H$, OH or $NR_1R_2$ where $R_1$ and $R_2$ are hydrogen or $C_1$ to $C_6$ alkyl.

As will be apparent from the above, these coupling moieties or compounds contain an N-bonded H atom reactive with the reactive halogen atom in the modified polymer particle, and a labile H atom in position for coupling with the subsequently applied color-producing diazonium salt. Naturally, when the reactive group in the polymerized RGC monomer is other than halogen, the coupling moiety must contain a group or atom reactive with such other reactive group.

The diazotizable primary aromatic amines useful herein include substantially all those well known in the dye art. Of particular value are those of the following formulae:

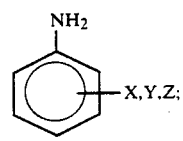

IV

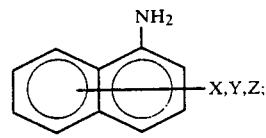

V

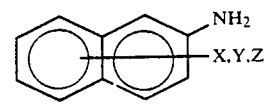

VI wherein X, Y and Z are independently hydroxyl, sulfo, nitro, H, chloro, bromo, $-COONa$, $C_1$ to $C_6$ alkoxy, $C_1$ to $C_6$ alkyl, acylamido (e.g. $-NHCOCH_3$), $-SO_2CH_2CH_2OSO_3Na$, $-SO_2CH_2CH_2CH_2Cl$, etc.

Examples of compounds of Formulae IV, V and VI include aniline, p-nitroaniline, p-aminobenzoic acid, sulfanilic acid, 2-hydroxy sulfanilic acid, 2,5-dimethylaniline, p-aminoacetanilide, anisidine, 2,5-dichloro-4-nitroaniline, 5-hydroxy-7-sulfo-B-naphthylamine, 4,8-disulfo-B-naphthylamine, etc.

In addition to the foregoing preferred color-producing diazotizable amines, another preferred class includes proteins which contain diazotizable primary amine groups.

The general procedures for preparing the colored products of this invention have been described earlier herein. In more specific terms, where the product is of the "structured particle" type one may utilize any previously prepared latex, especially a latex prepared by an emulsion polymerization method following general procedures well known in the art. The main chemical reaction is the known free radical polymerization. The polymerization is preferably initiated by the decomposition of nonionic type initiators (without release of polar groups) or cationic types, such as peroxides, hyperoxides, or azo compounds, as well as by use of the redox mechanism or by irradiation. There are three stages for free radical polymerization: initiation, propagation and termination. The number of particles initiated depends inter alia on the type and concentration of emulsifiers, type and concentration of electrolyte, the rate of free radical generation, temperature, and type and intensity of agitation.

When using an emulsifier the main site of polymerization initiation is the monomer-swollen micelles; without the emulsifier, the polymerization usually starts in the aqueous phase and as the radicals grow in size, they may become surface-active and combine to form the polymer particles. If a monodisperse latex is to be prepared the surfactant concentration must be below the critical micelle concentration (CMC). Examples of preferred surfactants include hexadecyl trimethyl ammonium bromide (HDTMAB) and other conventional cationic, generally quaternary ammonium, surfactants, the nonionic and anionic surfactants being progressively less preferred especially when an amine coupler reactant is to be employed which optimally calls for a cationic surface charge on the polymer particle.

Suitable cationic surfactants preferred herein for use as emulsifiers in the polymerization steps and as post-stabilizers of the aqueous media resulting from the reaction of the modified polymer particles (i.e. the polymerized RGC monomer) with the primary or secondary amine capable of coupling (e.g. N-methylaniline) include generally the quaternary ammonium compounds which may be described as containing, in addition to the usual halide (chloride, bromide, iodide, etc.) sulfate, phosphate or other anion, aliphatic and/or alicyclic radicals, preferably alkyl and/or aralkyl, bonded through carbon atoms therein to the remaining 4 available positions of the N atom, 2 or 3 of which radicals may be joined to form a heterocycle with the N atom, at least one of such radicals being aliphatic of at least 10 up to 22 or more carbon atoms. As illustrative of such cationic surfactants there may be mentioned the above HDTMAB, distearyldimethyl ammonium chloride, stearyl dimethyl benzyl ammonium chloride, coconut alkyl dimethyl benzyl ammonium chloride, dicoconut alkyl dimethyl ammonium bromide, cetyl pyridinium iodide, cetyl trimethyl ammonium bromide and the like. Other cationic emulsifiers include laurylamine hydrochloride, diethylaminoethyloleylamide HCl, the diethylcyclohexylamine salt of cetyl sulfuric ester, and the like.

Suitable "modifiers" or chain transfer agents include the primary, secondary and tertiary aliphatic mercaptans, e.g. n-dodecylmercaptan and similar alkyl mercaptans, thiophenol, alpha and beta thionaphthol and the like.

Examples of azo initiators include 2,2′ azobisisobutyronitrile (AIBN) and 2,2′ azobis (2-amido) propane hydrochloride (AAP). Other initiators include hydrogen peroxide, t-butyl hydroperoxide, p-menthane hydroperoxide, and redox systems such as ethylene diamine and sodium formaldehyde sulfoxylate, augmented optionally by heavy metal ions such as ferrous in small amounts.

The amounts of surfactant, catalysts and chain transfer agent will generally vary between about 0.5% to about 10%, preferably from about 0.1% to about 5% and most preferably from about 0.1% to about 2% based on monomer(s) weight.

The various reaction temperatures will range as follows. For the emulsion polymerization it is customary to carry out the polymerizations at from about room temperature to about 100° C. A preferred range is from about 25° C. to about 85° C., and usually about 70° C. For the polymer-modification procedure (e.g. amination), reaction temperatures may vary from about room temperature (e.g. 20° C.) to about 100° C. with 20° C. to about 70° C. being preferred.

This reaction at about room temperature may take up to 1 to 35 days for completion, at elevated temperatures less than a day, and in hours with the further assistance of catalysts such as pyridine, tertiary amines, etc.

In the reactions involving the RGC monomer (polymerization) and between the polymerized RGC monomer and the reactive coupler (e.g. amination), the latex polymer solids concentration is preferably below 5 or 10%, usually about 2%, at which concentrations cleanup by serum replacement (see Example 1C below) is most efficient. Higher concentrations of 10–50% could be employed using other less efficient cleanup procedures such as centrifugation, decantation, etc. The latex polymer average particle size during and resulting from the process of this invention is generally about 0.03 to 3, preferably about 0.1 to 0.3, microns ($\mu$m). Extremely small particle size requires unduly high amounts of emulsifier surfactant for stabilization. On the other hand, this invention is operative with larger particle sizes even up to beads and other polymer substrates.

In the reaction between the polymerized RGC monomer particles and the reactive coupler (e.g. amination with N-methylaniline), it will be understood that at least a stoichiometric amount of said coupler, based on the reactive groups in the said polymerized RGC monomer particles, should be employed up to a relatively small excess thereover since unreacted coupler must be thereafter removed, e.g. by serum replacement.

Similar considerations as to stoichiometric amounts and excess amounts thereover apply with respect to the coupling reaction with the diazonium salt. The diazotization of the diazotizable aromatic primary amine with sodium nitrite, and the coupling thereof with the coupler-surfaced polymer particles is conducted by procedures conventional in the azo dye art, generally at low temperatures of 5° to 0° C. or less, the coupling reaction generally being completed in from about 1 to 48 hours. The surface charge on the final azo-colored polymer latex particles will depend on the type of diazonium compound employed, e.g. anionic with a sulfonic diazonium compound, cationic with a quaternary ammonium or aminodiazonium compound.

If desired, the colored polymer particles may be isolated from the final latex as a pigment suitable for many uses as in latex paints, colored films, etc. The optimum particle size for any desired use and color intensity is readily determinable by routine trial of a suitable range of particle sizes in such use. For example, an average particle size of about 0.25 $\mu$m is considered effective for hiding a TiO$_2$ pigmented polymer.

In addition to the many uses of colored latexes described above, films produced with the products of this invention may, with proper selection of coupler and diazonium salt, be employed as pH indicators.

The following examples are only illustrative and not limitative. All amounts and proportions referred to herein and in the appended claims are by weight, and temperatures in °C., unless otherwise indicated.

EXAMPLE I

This example illustrates the preparation of a yellow colored latex of the formula shown in FIG. 1.

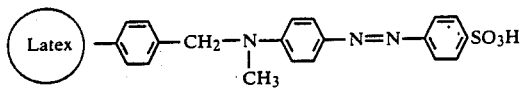

FIG. I

A. Seed latex preparation.

The seed latex is prepared by bottle polymerization. The bottle is charged with 0.1 g of hexadecyltrimethylammonium bromide (HDTMAB), 200 g of water, 40 g of styrene, 0.2 g of 2,2'-azobisisobutyronitrile (AIBN), 0.004 g of dodecyl mercaptan, and 0.012 g of sodium chloride with grade 5 nitrogen bubbled through the gasket for 20 minutes. The capped bottle with its contents is then rotated end-over-end at 30 r.p.m. in a thermostated water bath for 24 hours at 70° C. The latex is filtered to remove all coagulum formed during polymerization. The conversion is 66%.

B. Structured-particle latex preparation.

The shell-layer polymerization is carried out in a 3 neck 1000 ml flask. 300 g of 6.67% solids content of the above seed latex and 0.26 g of HDTMAB are added to the flask. Nitrogen is bubbled through the latex in the flask. A mixture of 2 g of styrene monomer, 6 g of vinylbenzyl chloride (VBC), and 0.32 g of AIBN solution is added to the flask drop by drop over a two hour period. The mixture is agitated at a moderate rate throughout the polymerization, which is carried out for 7 hours. Unreacted monomer is removed by steam distillation under vacuum. The conversion is found to be over 96% with a particle size of 160 nm (nanometers). At this state, the polymer particles would look like FIG. II.

FIG. II

C. Amination 355 g of 2% solids content of the above structured-particle latex is then reacted with 4.2 g of the N-methylaniline nucleophile for 10 days at room temperature. Most of the unreacted N-methylaniline is removed by "serum replacement" using a pH 2.3 hydrochloric acid solution first and then followed by distilled deionized water. After serum replacement, 0.2 g of HDTMAB is added as a post-stabilizer. Serum replacement in this case means agitating the latex in a cell above a filter disc that would allow an aqueous phase to pass but not the latex particles. After this step the modified latex particles are as depicted in FIG. III.

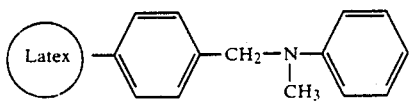

FIG. III

D. Colorant production 1.73 g of sulfanilic acid is dissolved in a 5% sodium carbonate solution. A solution of 0.69 g of sodium nitrite in about 2 ml of water is added to the solution of sodium sulfanilate. The mixture is cooled to almost 0° C. and dropped with stirring into an ice-cold solution of 0.98 g of concentrated sulfuric acid in water. The white diazonium salt separates instantaneously. The precipitate is filtered by suction. The diazonium salt is then added to 300 g of 2% solid content aminated latex from C above in a 500 ml round-bottom flask which is kept between 0° to 5° C. A yellow color forms gradually, and the reaction temperature is kept 0° to 5° C. for 48 hours. The decomposed diazonium salt and the absorbed dyestuff can be removed by distilled deionized water and 95% alcohol. After the coupling reaction, the modified latex has the structure depicted in FIG. I.

The cleaned yellow latex has a zeta potential of 54 mV in distilled deionized water and a maximum absorption at wavelength of 440 m$\mu$ measured by a KCS-40 spectrophotometer. A pure white acrylic latex paint can be tinted with the yellow latex very easily. The yellow latex can also be blended with 60:40 poly(styrene-butadiene) (Dow LS-1176-B) to make a particle volume concentration 40% including 0.5% of methyl cellulose as the thickener.

A K303 coater is used to drawdown the uniform film thickness of the paint. Good yellow dry films are obtained. The yellow films can be changed to red color in strong acid solution and change back to yellow color in basic solution. Thus, the colored latex can be a pigment and a pH indicator.

EXAMPLE 2

This example illustrates the preparation of the red-orange latex with the formula depicted in FIG. IV.

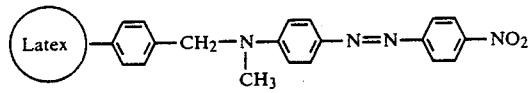

FIG. IV

A. Seed latex preparation
Same as Example 1-A.

B. Structured-particle preparation

The shell-layer polymerization is carried out in the 3 neck 1000 ml flask. 300 g of 6.67% solids content seed latex, 0.26 g of HDTMAB, and 0.32 g of 2,2'-azobis(2-amido) propane hydrochloride (AAP), are added to the flask and allowed to come to a reaction temperature of 70° C. Nitrogen is bubbled through the latex in the flask. A mixture of 2 g of styrene monomer, and 6 g of VBC is added to the flask drop by drop over a two hour period. The mixture is agitated at a moderate rate throughout the polymerization which is carried out for 7 hours. Unreacted monomer is removed by steam distillation under vacuum. The conversion is found to be over 99% with a particle size of 160 nm. The structure is the same as previously depicted in FIG. II.

c. Amination
Same as Example 1-C.

D. Colorant production 0.69 g of p-nitroaniline is added to a mixture of concentrated hydrochloric acid and water. 0.35 g sodium nitrite is added with stirring. The diazonium salt solution thus formed is added to 300 g of 2% solid content aminated latex from C in a 500 ml round-bottom flask which is kept between 0° to 5° C. The red-orange color appears gradually. The latex has a maximum absorption at wavelength of 480 m$\mu$ measured by KCS-40 spectrophotometer. After the coupling reaction, the modified latex has the structure depicted in FIG. IV.

EXAMPLE 3

This example illustrates the preparation of a yellow latex, but cationic initiator AAP is used (see Example 2B)

A. Seed latex preparation

The seed latex is prepared by bottle polymerization. The bottle is charged with 0.4 g of HDTMAB, 156 g of water, 40 g of styrene, 0.04 g dodecyl mercaptan, and 0.01 g of sodium chloride with grade 5 nitrogen bubbled through the gasket for 5 minutes. 4 ml of 0.2 g of AAP aqueous solution is injected through the cap by a syringe. The capped bottle with the above contents is then rotated end-over-end at 30 r.p.m. in a thermostated water bath for 24 hours at 70° C. The latex is filtered to remove all coagulum formed during polymerization. The conversion is 97%.

B. Structured-particle latex preparation

The shell-layer polymerization is also carried out by bottle polymerization. 200 g of 5% solids content seed polystyrene latex is swollen with a mixture of 1 g of styrene and 3 g of VBC for 30 minutes. 0.16 g of AAP aqueous solution is injected through the cap. The capped bottle is rotated end-over-end at 30 r.p.m. in a thermostated water bath for 24 hours at 70° C. The conversion is over 99% with particle size 62 nm. Unreacted monomer is removed by steam distillation under vacuum.

C. Amination 300 g of 2% solids content of structured-particle latex is then reacted with 2 g of N-methylaniline for 4 days at room temperature. Most of the unreacted N-methylaniline is removed by serum replacement with a hydrochloric acid solution in deionized water of pH 2.3. 0.2 g of HDTMAB is added as a post-stabilizer.

D. Colorant production

Same as Example 1D.

EXAMPLE 4

This example illustrates the preparation of a yellow colored latex with the formula shown in FIG. I.

A. Seed latex preparation

The bottle is charged with 0.8 g of HDTMAB, 160 g of water, 80 g of styrene, 1.6 g of AIBN, and 0.06 g of dodecyl mercaptan with grade 5 nitrogen bubbled through the gasket for 20 minutes. The capped bottle with its contents, is then rotated end-over-end at 30 r.p.m. in a thermostated water bath for 24 hours at 70° C. The latex is diluted and filtered to remove all coagulum formed during polymerization. The particle size is 94 nm.

B. Structured-particle latex preparation

The shell-layer polymerization is also carried out by bottle polymerization. 150 g of 6.67% solids content seed polystyrene latex and 0.13 g of HDTMAB is added to a mixture of 2 g of styrene, 3 g of VBC, and 0.16 g of AIBN. Grade 5 nitrogen is bubbled through the gasket for 5 minutes. The capped bottle is rotated end-over-end at 30 r.p.m. in thermostated water bath for 24 hours at 70° C. Unreacted monomer is removed by steam distillation under vacuum. The particle size is 108 nm.

C. Amination 300 g of 2% solids content of structured-particle latex is then reacted with 2.6 g of N-methylaniline for 6 days at room temperature. Most of the unreacted N-methylaniline is removed by "serum replacement" using a pH 2.3 hydrochloric acid solution first then followed by distilled deionized water. 0.2 g of HDTMAB is added as a post-stabilizer.

D. Colorant production

A yellow latex is prepared substantially as described in Example 1-D.

EXAMPLE 5

A yellow latex is prepared substantially as described in Example 1 except that the time for amination is 60 hours instead of 10 days, and the temperature for the reaction is 70° C. rather than 25° C.

EXAMPLE 6

This example illustrates the preparation of a yellow colored latex with the formula shown in FIG. 1.

A. Seed latex preparation

Same as Example 1-A.

B. Structured-particle latex preparation

Structured-particle latex is prepared substantially as described in Example 4-B except that 0.5g of styrene and 3.5 g of VBC are used instead of 2 g of styrene and 3 g of VBC.

C. Amination

Same as Example 1-C except that reaction time is 14 days instead of 10 days.

D. Colorant production

Same as Example 1-D.

EXAMPLE 7

This example illustrates the preparation of a yellow colored latex with the formula shown in FIG. I.

A. Seed latex preparation

Seed latex is prepared substantially as described in Example 1-A except that 0.05 g of HDTMAB is used instead of 0.1 g of HDTMAB. The particle size is 198 nm.

B. Structured-particle latex preparation

Same as Example 6-B.

C. Amination

Same as Example 1-C.

D. Colorant production

Same as Example 1-D.

EXAMPLE 8

This example illustrates the preparation of a yellow colored latex with the formula shown in FIG. I.

A. Seed latex preparation

Same as Example 7-A.

B. Structured-particle latex is prepared substantially as described in Example 1-B except that 6 g of styrene and 2 g of VBC are used instead of 2 g of styrene and 6 g of VBC.

C. Amination

Same as Example 1-C except that 1.4 g of N-methylaniline is used instead of 4.2 g of N-methylaniline.

D. Colorant production

Same as Example 1-D.

EXAMPLE 9

This example illustrates the preparation of a yellow colored latex with the formula shown in FIG. I.

A. Seed latex preparation

Same as Example 7-A. The particle size is 198 nm.

B. Structure-particle latex preparation

Same as Example 1-B. The particle size is 240 nm.

C. Amination

Same as Example 1-C.

D. Colorant production
Same as Example 1-D.

EXAMPLE 10

A yellow latex is prepared substantially as described in Example 9 except that the time for amination is 35 days instead of 10 days.

EXAMPLES 11-20

Examples 1-10 are each separately repeated except that the seed latex preparation (Step A) is omitted and colored polymer is formed from the Step B latex alone (i.e. particles of styrene-p-vinylbenzyl chloride polymer). Colored latexes are obtained in each instance excellently.

EXAMPLES 21 and 22

Examples 1 and 11 are repeated except that the monomer in Step B is all (5 gm) p-vinylbenzyl chloride.

EXAMPLES 23-26

Examples 1, 11, 21 and 22 are each repeated separately utilizing 2 chloroethyl acrylate monomer in place of p-vinylbenzyl chloride.

EXAMPLE 27-30

Examples 1, 11, 21 and 22 are each again repeated utilizing the following monomers in place of p-vinylbenzyl chloride:
(a) 2-chlorallyl acetate
(b) 2-chloroethyl itaconate
(c) 2-chloromethyl methacrylate
(d) 2-chlorobenzal acetophenone The latexes produced in the foregoing examples not only have excellent color but in addition, they are extremely stable products. The modified polymer latexes, as well, (i.e. Step C in the foregoing examples) also have enhanced stability.

We claim:

1. A colored polymer produced by reacting a compound (A), which is capable of coupling to an aromatic diazonium compound (B), with a polymer (C) suspended in aqueous latex form and containing a reactive halogen group capable of reacting with said compound (A) and thereafter coupling the resulting reaction product in said latex to said aromatic diazonium compound (B) to produce said colored polymer containing an azo chromophore.

2. A colored polymer as defined in claim 1 wherein polymer (C) comprises the polymerizate of an $\alpha\beta$-etheylenically unsaturated monomer (D) containing said reactive halogen group.

3. A colored polymer as defined in claim 2 wherein comppound (A) is an aromatic amine.

4. A colored polymer as defined in claim 2 wherein said reactive halogen group is chloroalkyl.

5. A colored polymer as defined in claim 4 wherein said chloroalkyl is chloromethyl.

6. A colored polymer as defined in claim 4 wherein said chloroalkyl is chloroethyl.

7. A colored polymer as defined in claim 2 wherein said reactive halogen group is linked to a carbon atom olefinically linked to another carbon atom.

8. A colored polymer as defined in claim 3 wherein monomer (D) is p-vinylbenzyl chloride and compound (A) is an N-alkylaniline.

9. A colored polymer as defined in claim 8 wherein compound (A) is N-methylaniline and compound (B) is the diazonium salt of sulfanilic acid or p-nitroaniline.

10. A colored polymer as defined in claim 3 wherein polymer (C) comprises the polymerizate of a mixture (M) of $\alpha\beta$-ethylenically unsaturated monomers at least about 5 mole% thereof being monomer (D).

11. A colored polymer as defined in claim 10 wherein said mixture (M) includes about 5-95 mole% styrene.

12. A colored polymer as defined in claim 11 wherein monomer (D) is p-vinylbenzylchloride, compound (B) is the diazonium salt of sulfanilic acid or p-nitroaniline.

13. A colored polymer as defined in claim 1 wherein said polymer (C) is in the form of a shell surrounding a core of a polymerized $\alpha\beta$-ethylenically unsaturated compound.

14. A colored polymer as defined in claim 10 wherein said polymer (C) is in the form of surface layer on a core of a polymerized $\alpha\beta$-ethylenically unsaturated compound.

15. A colored polymer as defined in claim 14 in latex form and wherein the core comprises polystyrene.

16. A colored polymer as defined in claim 15 where the polystyrene latex is a monodisperse or polydisperse system wherein $D_w/D_n$ ranges from 1.001 to about 5.

17. A colored polymer as defined in claim 16 wherein the polystyrene latex is a monodispersed latex wherein $D_w/D_n$ is less than about 1.05.

18. A colored polymer as defined in claim 3 wherein compound (B) is a protein containing a diazotizable primary amino group.

19. A method for preparing a colored polymeric product which comprises reacting in an aqueous medium finely divided polymer containing a reactive halogen group with a compound (A) containing a group reactive with said reactive group-containing polymer to produce a modified polymer capable of coupling to an aromatic diazonium compound, and coupling said modified polymer in said aqueous medium to said diazonium compound to produce a colored polymer containing an azo chromophore.

20. A method as defined in claim 19 wherein the polymer contains a reactive chloromethyl group, and compound (A) is an aromatic amine capable of coupling to an aromatic diazonium compound.

21. A method as defined in claim 20 including the step of producing said finely divided polymer-containing aqueous medium by subjecting to polymerization conditions an aqueous emulsion containing a polymerizable monomer containing a reactive chloromethyl group.

22. A method as defined in claim 21 wherein said aqueous emulsion comprises a latex of a polymerized $\alpha\beta$-ethylenically unsaturated monomer.

* * * * *